United States Patent [19]

Heath et al.

[11] 4,105,825

[45] Aug. 8, 1978

[54] POLYOLEFIN WITH PHOSPHORYLATED NOVOLAC FLAME RETARDANT, PEROXIDE CURED, AS METALLIC INSULATOR

[75] Inventors: Darrell Richard Heath, Schofield, Wis.; Fred Frank Holub, Schenectady, N.Y.; Edward Vincent Wilkus, Trumbull, Conn.

[73] Assignee: General Electric Company, New York, N.Y.

[21] Appl. No.: 702,042

[22] Filed: Jul. 2, 1976

Related U.S. Application Data

[63] Continuation of Ser. No. 574,188, Feb. 5, 1975, abandoned.

[51] Int. Cl.² .................. B32B 15/08; C08L 23/08
[52] U.S. Cl. ................................ 428/379; 260/38; 260/846; 260/848

[58] Field of Search ............... 260/848, 38; 428/379

[56] References Cited

U.S. PATENT DOCUMENTS

| | | | |
|---|---|---|---|
| 2,888,424 | 5/1959 | Precopio et al. | 260/41 |
| 2,979,484 | 4/1961 | Redfarn | 260/51 |
| 3,100,197 | 8/1963 | Heuck et al. | 260/848 |
| 3,297,631 | 1/1967 | Bown et al. | 260/848 |
| 3,527,725 | 8/1970 | Strauss et al. | 260/848 |
| 3,697,459 | 10/1972 | Dannels et al. | 260/848 |
| 3,930,104 | 12/1975 | MacKenzie et al. | 260/848 |

Primary Examiner—Murray Tillman
Assistant Examiner—Arthur H. Koeckert
Attorney, Agent, or Firm—R. G. Simkins; P. L. Schlamp

[57] ABSTRACT

Flame-resistant, cured polyolefin compositions comprising phosphorylated novolac-type phenolformaldehyde condensate, electrical conductors insulated with said compositions, and method of producing same.

18 Claims, 1 Drawing Figure

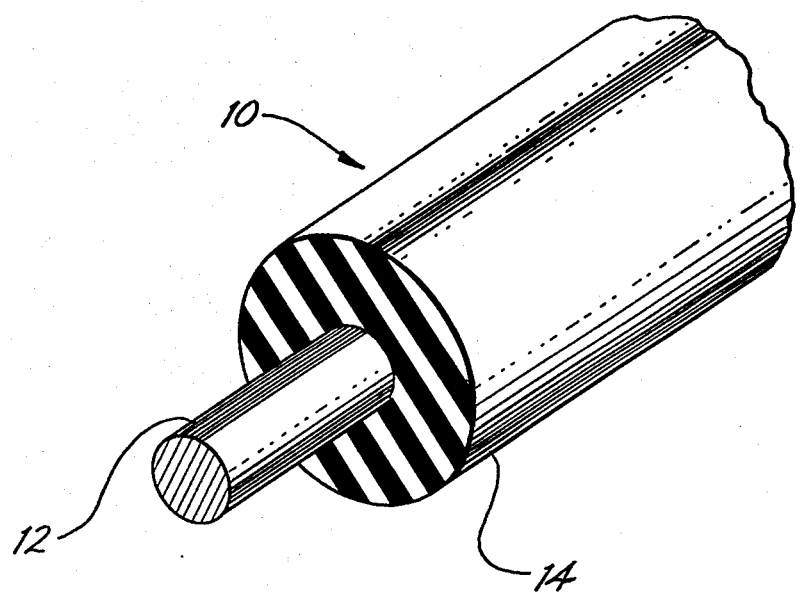

POLYOLEFIN WITH PHOSPHORYLATED NOVOLAC FLAME RETARDANT, PEROXIDE CURED, AS METALLIC INSULATOR

This application is a continuation of application Ser. No. 547,188, filed Feb. 5, 1975, of the same title.

BACKGROUND OF THE INVENTION

The increased use of polymeric compositions such as polyolefins in many and diverse applications or products including polyolefin insulated wiress and cables, and the combustibility of polymeric materials, have greatly stimulated the investigation of flame-proofing measures for polymeric compositions. Moreover, the high costs of fire damage in lives and property, and the imposition of increasingly stringent safety regulations, have recently significantly intensified the pursuit of more effective or practical means of controlling or inhibiting confusion in many products and materials.

Notwithstanding the development of a great number of flame proofing measures or additives resulting from this expanding effort, there remains a continuing need for improvements to meet current or new requirements in this area.

SUMMARY OF THE INVENTION

This invention comprises the discovery of the improved resistance to flame or combustion and other advantages attributable to the combination of a phosphroylated novolac-type phenol-formaldehyde condensate with crosslink cured polyolefins such as polyethylene. The invention thus relates to crosslink curable polyolefin compounds and a method of rendering such compounds resistant to flame and combustion, and it has particular utility in flame-proofing electrical insulations comprising ethylene-containing polymer compounds.

OBJECTS OF THE INVENTION

It is a primary object of this invention to provide thermoset polyolefin compounds of improved resistance to flame and combustion, and a method of producing same.

It is an additional object of this invention to provide an improved flame-resistant insulated electrical conductor.

It is another object of this invention to provide a filled and crosslink cured polyolefin compound, and electrical insulations thereof which are highly resistant to flame and combustion.

It is also an object of this invention to provide a flame-proofing material for polyolefin compounds which retains its potential to inhibit flaming and combustion of polyolefins over extended periods of time and throughout exposure to many adverse conditions, and imparts non-dripping and char-forming properties to the compound.

It is a further object of this invention to provide a polymeric compound containing a polyolefin admixed with a flame-proofing material which is highly resistant to bleeding or blooming from the compound, and which has desired thermal stability at temperatures below flame conditions and thus is not subject to loss of the flame resisting components.

It is a still further object of this invention to provide a flameproofing material and polyolefin compounds containing the same which do not discernibly corrode or tarnish metals, such as copper, and thus are serviceable as effective and practical flame-resistant polyolefin electrical insulating compositions for metal wires or cables, or other metallic electrical conductors.

BRIEF DESCRIPTION OF THE DRAWING

The drawing is a perspective illustration of an insulated conductor comprising a metallic wire having a polymeric insulation thereabout.

DESCRIPTION OF A PREFERRED EMBODIMENT

In accordance with this invention, a high level of resistance to flame and combustion is achieved in crosslink cured polyolefin compounds comprising ethylene-containing polymers, among other improved and advantageous attributes, by combining therewith phosphorylated novolac-type phenol-formaldehyde resin.

The crosslink curable polyolefin compositions of this invention comprise ethylene-containing polymers such as polyethylene, copolymers of ethylene and other polymerizable materials, and blends of such polymers including copolymers. Typical copolymers of ethylene and other polymerizable materials include, for example, ethylene-propylene copolymers and ethylene-propylene diene terpolymers, ethylene-vinyl acetate, ethylene-ethyl acrylate, ethylene alkylacrylate copolymers, and ethylene-methyl acrylate.

The polyolefin compounds of this invention include fillers, and can contain other conventional ingredients or additives such as pigments, curing co-agents, preservatives such as antioxidants, modifying agents, mold release ingredients, and the like which are commonly compounded with polyolefins.

Suitable fillers comprise: clays, carbon blacks, wood floor, tricalcium phosphate, mineral phosphates, mineral sulfates, aluminas, silicas, fumed silicas, iron oxides, glass fiber, asbestos, and the like.

The invention specifically applied to and includes all of the above-referenced polyolefins which can be crosslinked cured to a thermoset state by means of heat-activated peroxide crosslinking agents such as disclosed in U.S. Pat. Nos. 2,888,424; 3,079,370; 3,086,966 and 3,214,422. Suitable peroxide crosslink curing agents comprise organic tertiary peroxides characterized by at least one unit of the structure:

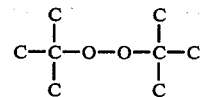

which decomposes at a temperature above about 295° F and thereby provide free radicals. A preferred peroxide is a di-α-cumyl peroxide, and other apt peroxides comprise the tertiary diperoxides such as 2,5-dimethyl-2,5-di(t-butyl peroxy) hexane and 2,5-dimethyl-2,4-di(t-butyl peroxy) hexyne-3, and the like diperoxy and polyperoxide compounds.

The phosphorylated novolac phenol-formaldehyde component of this invention consists of the reaction product of phenol formaldehyde condensation novolac resin and triphenylphosphate. For example, a phenol formaldehyde condensation novolac resin (1669 grams) of the formula:

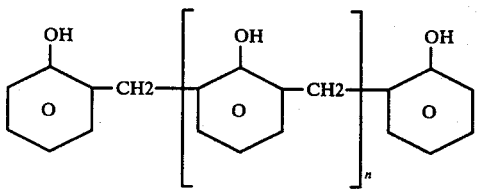

is reacted with triphenylphosphate (5740 grams) by heating in the presence of about 0.1 grams of magnesium catalyst at a temperature of about 280° C for a period of approximately 3 hours, during which time phenol is liberated and driven off.

The triphenylphosphate for the practice of this invention includes the compounds consisting of

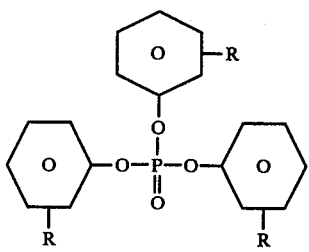

where R is H, Cl, Br or an alkyl radical. The phosphorylated novolac phenol product comprised.

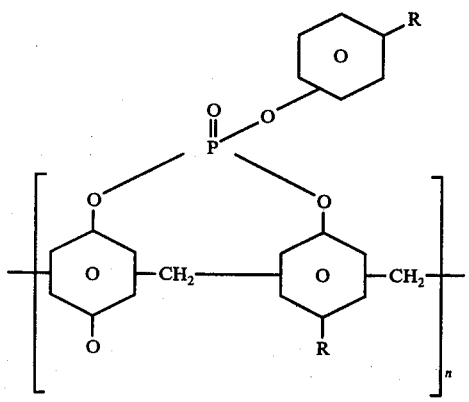

Unreacted triphenylphosphate may be removed from the product by subsequently applying reduced pressure at about 300° C.

The ingredients of phosphorylated novolak phenol-formaldehyde filler and polyolefin polymer of the combination of this invention can be mixed and combined by means of any conventional compounding method or apparatus, such as working in a Banbury mixer or on a two roll rubber mill. Preferably all ingredients of the compound formulation, except those which are sensitive to the relatively moderate mixing temperatures of about 300° to about 400° F, such as heat decomposable peroxide curing agent, are combined and initially admixed together at a temperature sufficient to soften and plasticize the particular polyolefin ingredient. Following the attainment of substantial uniformity of the admixed ingredients, the temperature of the admixed batch is reduced below the decomposition level of the particular peroxide curing agent, or other heat sensitive ingredient, and the curing agent or other sensitive ingredient is then introduced and dispersed preferably uniformly in the mix.

The proportions of the flame proofing combination of phosphorylated novolac phenol-formaldehyde condensate, filler and polyolefin polymer ingredients admixed together depend, of course, upon the desired or required degree of resistance to flame and combustion, and the content of polymeric or other combustible materials in the overall compound. Suitable amounts for effective flame resistance in polyolefins comprise about 5 to about 40 parts by weight of the phosphorylated novolac phenol-formaldehyde, and about 10 to about 300 parts by weight of the filler, per 100 parts by weight of the polyolefin or organic polymer content of the compound. However, greater or smaller quantities will suffice for particular applications.

The improvements and advantages of this invention are demonstrated by the following examples of the practice of the invention and the data derived from the examples of the invention and related prior art means or practices.

The formulations are all given in parts by weight of the enumerated ingredients. The compositions of the control and the examples were prepared and evaluated identically. That is, all ingredients, except the peroxide curing agent, were initially combined and mixed on a hot two-roll mill at a temperature of about 195° F for approximately five minutes, then in each case the peroxide was subsequently added and dispersed by mixing for about three minutes. Slab curing was effected by subjecting the slab specimens to 300° F in a press for 60 minutes. The wire specimens were made by coating #14 AWG solid copper conductor with the respective compositions at a thickness of about 50 mils, followed by curing the construction in steam at 400° F for two minutes.

| INGREDIENTS | SLAB SPECIMENS | | | WIRE SPECIMENS | |
|---|---|---|---|---|---|
| | CONTROL A | EXAMPLE I | EXAMPLE II | CONTROL B | EXAMPLE III |
| Polyethylene | 100 | 100 | 100 | 100 | 100 |
| Calcined Clay (Treated with 1% Silicone Tetramer) | 50.5 | 50.5 | 50.5 | 50.5 | 50.5 |
| Carbon Black | 5 | 5 | 5 | 5 | 5 |
| Antioxidant, Flectol H (Polymerized Trimethyl Dihydroquinoline) | 1.75 | 1.75 | 1.75 | 1.75 | 1.75 |
| Di-alpha Cumyl Peroxide | 3.3 | 3.3 | 3.3 | 3.3 | 3.3 |
| Phosphorylated Novolak Phenol-formaldehyde Condensate | — | 10 | 20 | — | 10 |
| Oxygen Index | 0.191 | 0.221 | 0.227 | 0.190 | 0.223 |
| Type of Char Formed & Dripping Behavior | Weak Char, | Strong Char, | Strong Char, | Weak Char, | Strong Char, |

-continued

| INGREDIENTS | SLAB SPECIMENS | | | WIRE SPECIMENS | |
|---|---|---|---|---|---|
| | CONTROL A | EXAMPLE I | EXAMPLE II | CONTROL B | EXAMPLE III |
| Copper Mirror Test | Drips | No Drip | No Drip | Drips | No Drip |
| % Removed After 16 Hrs. at 175° C | 0 | 0 | 0 | 0 | 0 |
| Surface Bloom | None | None | None | None | None |
| Insulation Resistance, original Ohm-Cm | $150 \times 10^{13}$ | $382 \times 10^{13}$ | $110 \times 10^{13}$ | | |
| After One Week in 75° C Water | $300 \times 10^{13}$ | $127 \times 10^{13}$ | $113 \times 10^{13}$ | | |

The relative resistance to flame or combustion of each composition of the examples of this invention and of the standards is demonstrated by the Oxygen Index Test (ASTM D-2863-70) data which designates the fraction of oxygen by volume in nitrogen required to just maintain flame for a material. Thus the higher the oxygen index for a material, the better its resistance to combustion and flame. The test was run upon each specimen of the polymeric materials of the Examples and Control Standards in the form of a test slab or as an insulation covering on wire.

The oxygen index test demonstrates the pronounced improvement in flame resistance of the compositions of this invention over similar materials.

The copper mirror test which measures the potential corrosive properties of materials on metal, is as follows: A given sample of the material for evaluation is placed in a test tube together with a copper glass mirror comprising vacuum deposited copper of a known weight. The copper mirror is suspended in the test tube above the sample and the tube sealed. The lower end of the sealed tube is then heated at 175° C for 16 hours in an oil bath or other suitable means while its upper end containing the copper mirror is maintained below 60° C. After heating for 16 hours, the copper mirror is removed and examined for evidence of corrosion, and if 50% or more of the copper is removed from the mirror, the material is classified as corrosive with respect to copper. Results are reported as the percentage of copper removed.

The phosphorylated novolac phenol-formaldehyde containing polymeric compounds showed no tendency to surface bloom or exude, whereas many organic phosphates such as triphenyl phosphate have poor compatability with ethylene-containing polymers and rapidly exhibit bloom or exudation.

Referring to the drawing, there is shown a typical construction for an insulated electrical wire or cable product 10, comprising a metallic conductive element 12 and an overlying body of cured polymeric insulation 14 extending thereabout or covering the conductor. In the drawing, the product 10 is illustrated as a short section with the insulation 14 removed from the end portion of the conductor 12. According to one embodiment of this invention, the novel flame-resistant polyolefin thereof can be used to provide or form the insulation 14 on a conductive element 12 of wire or cable product 10. It is to be understood from the foregoing, however, that the insulation can comprise a coating on any portion of a conductive element and that the insulation need not completely enclose the element where such is not necessary for a desired insulative effect.

Although the invention has been described with reference to certain specific embodiments thereof, numerous modifications are possible and it is desired to cover all modifications falling within the spirit and scope of this invention.

What we claim as new and desire to secure by Letters Patent of the United States is:

1. A flame-resistant polyolefin compound comprising the peroxide crosslink cured combination of an ethylene-containing polymer selected from the group consisting of polyethylene, copolymers of ethylene and other polymerizable materials, and blends of such polymers, and phosphorylated novolac phenol-formaldehyde resin, said phosphorylated novolac phenol-formaldehyde resin having been formed with a pentavalent organic phosphate.

2. The flame-resistant polyolefin compound of claim 1, comprising about 3 to about 40 parts by weight of phosphorylated novolac phenol-formaldehyde resin per 100 parts by weight of the ethylene-containing polymer.

3. The flame-resistant polyolefin compound of claim 1, wherein the ethylene-containing polymer comprises polyethylene crosslink cured with dicumyl peroxide.

4. A flame-resistant polyolefin compound comprising at least one organic peroxide crosslink cured ethylene-containing polymer selected from the group consisting of polyethylene, copolymers of ethylene and other polymerizable materials, and blends of such polymers, and about 5 to about 40 parts by weight of phosphorylated novolac phenol-formaldehyde resin per 100 parts by weight of the ethylene-containing polymer, said phosphorylated novolac phenol-formaldehyde resin being the reaction product of triphenylphosphate and phenol-formaldehyde condensation novolac resin.

5. The flame-resistant polyolefin compound of claim 4, wherein the compound has been crosslink cured to a substantially thermoset condition with a free radical forming organic tertiary peroxide curing agent.

6. The flame-resistant polyolefin compound of claim 5, comprising about 10 parts by weight of phosphorylated novolac phenol-formaldehyde resin per 100 parts by weight of the ethylene-containing polymer.

7. A method of rendering polyolefin compounds resistant to flame, comprising admixing an ethylene-containing polymer selected from the group consisting of polyethylene, copolymers of ethylene and other polymerizable materials, and blends of such polymers, with phosphorylated novolac phenol-formaldehyde resin and crosslink curing the ethylene-containing polymer with an organic peroxide curing agent, said phosphorylated novolac phenol-formaldehyde resin having been formed with a pentavalent organic phosphate.

8. The method of claim 7, wherein the phosphorylated novolac phenol-formaldehyde resin in an amount of about 10 to about 20 parts by weight is admixed with 100 parts by weight of the ethylene-containing polymers.

9. The method of claim 7, wherein the ethylene-containing polymer comprises polyethylene crosslink cured with dicumyl peroxide.

10. A method of rendering cured polyolefin compounds resistant to flame comprising admixing about 5 to about 40 parts by weight of phosphorylated novolac phenol-formaldehyde resin with 100 parts by weight of at least one ethylene-containing polymer selected from the group consisting of polyethylene, copolymers of ethylene and other polymerizable materials, and blends of such polymers, and crosslink curing the ethylene-containing polymer with an organic peroxide curing agent, said phosphorylated novolac phenol-formaldehyde resin being the reaction product of triphenylphosphate and phenol-formaldehyde condensation novolac resin.

11. The method of claim 10, wherein the compound is crosslink cured to a substantially thermoset condition by the addition of a free radical forming organic tertiary peroxide curing agent and heating the compound containing said curing agent.

12. The method of claim 11, wherein the phosphorylated novolac phenol-formaldehyde resin is an amount of about 10 parts by weight and is admixed with 100 parts by weight of the polyolefin.

13. An insulated electrical conductor including a metallic element having a surface thereof covered with an insulation of flame-resistant, organic peroxide crosslink cured polyolefin compound comprising the combination of an ethylene-containing polymer selected from the group consisting of polyethylene, copolymers of ethylene and other polymerizable materials, and blends of such polymers and about 5 to about 40 parts by weight of phosphorylated novolac phenol-formaldehyde resin, per 100 parts by weight of the polyolefin, said phosphorylated novolac phenol-formaldehyde resin having been formed with a pentavalent organic phosphate.

14. The insulated electrical conductor of claim 13, wherein the polyolefin compound of the insulation comprises about 10 to about 20 parts by weight of phosphorylated novolac phenol-formaldehyde resin per 100 parts by weight of the ethylene-containing polymer.

15. The insulated electrical conductor of claim 13, wherein the ethylene-containing polymer comprises polyethylene crosslink cured with dicumyl peroxide.

16. An insulated electrical conductor including a metallic element having thereabout an insulation of flame-resistant, crosslink cured polyolefin compound comprising at least one ethylene-containing polymer selected from the group consisting of polyethylene, copolymers of ethylene and other polymerizable materials, and blends of such polymers, about 5 to about 40 parts by weight of phosphorylated novolac phenol-formaldehyde resin and about 10 to about 300 parts by weight of filler per 100 parts by weight of the ethylene-containing polymers, said phosphorylated novolac phenol-formaldehyde resin being the reaction product of triphenylphosphate and phenol-formaldehyde condensation novolac resin.

17. The insulated electrical conductor of claim 16, wherein the ethylene-containing polymer has been crosslink cured to a substantially thermoset condition with a free radical forming organic tertiary peroxide curing agent.

18. The insulated electrical conductor of claim 17, comprising about 10 parts by weight of phosphorylated novolac phenol-formaldehyde resin and about 55 parts by weight of filler per 100 parts by weight of the ethylene-containing polymer.

* * * * *